(12) United States Patent
Björnson

(10) Patent No.: US 6,298,339 B1
(45) Date of Patent: Oct. 2, 2001

(54) MANAGEMENT IN DATA STRUCTURES

(75) Inventor: Stefan Björnson, Nynäshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/215,122

(22) Filed: Dec. 18, 1998

(30) Foreign Application Priority Data

Dec. 19, 1997 (SE) .................................................... 9704767

(51) Int. Cl.⁷ .................................................. G06F 17/30
(52) U.S. Cl. ...................... 707/3; 707/1; 707/2; 707/100; 707/201
(58) Field of Search ........................... 707/1, 2, 3, 100, 707/201

(56) References Cited

U.S. PATENT DOCUMENTS

| | | | |
|---|---|---|---|
| 4,468,728 | * 8/1984 | Wang | 707/1 |
| 4,611,272 | * 9/1986 | Lomet | 707/3 |
| 5,497,485 | 3/1996 | Ferguson et al. | 395/600 |
| 5,560,007 | 9/1996 | Thai | 395/600 |
| 5,802,159 | * 9/1998 | Smolentzov et al. | 379/201 |
| 5,930,805 | * 7/1999 | Marquis | 707/201 |
| 6,065,046 | * 5/2000 | Feinberg et al. | 709/216 |
| 6,141,655 | * 10/2000 | Johnson et al. | 707/2 |

FOREIGN PATENT DOCUMENTS

| | | | |
|---|---|---|---|
| WO96/00945 | 1/1996 | (WO) | 17/30 |
| WO97/21178 | 6/1997 | (WO) | 17/30 |

OTHER PUBLICATIONS

Douglas Comer, "The Ubiquitous B–Tree", Computing Surveys, vol. 11, No. 2, Jun. 1979, pp. 121–137.*
Sussenguth, Jr., "Use of Tree Structures for Processing Files,"Comm of the ACM, vol. 6, No. 5, May 1963.

* cited by examiner

*Primary Examiner*—Paul R. Lintz
(74) *Attorney, Agent, or Firm*—Burns, Doane, Swecker & Mathis, L.L.P.

(57) ABSTRACT

The present invention relates to a data structure and a method for, in a datastructure, managing sequences of symbols (e.g numbers or words). A solution with a double set of records is employed where the first set of records is defined by a linked list of records which are array records of pointers with one element for each symbol (e.g digit or letter). The second set of records is defined by strings where the complete sequences of symbols are stored. The managing of the data structures would suitably comprise storing, deleting and finding/searching the sequences of symbols.

6 Claims, 10 Drawing Sheets

| Step | Depth | Cur digit | Cur ptr | Cur rec | Cell no | Cell ptr |
|---|---|---|---|---|---|---|
| 1 | 1 | - | A0p | A0 | - | - |
| 2 | 1 | 3 | A0p | A0 | - | - |
| 3 | 1 | 3 | A1p | A0 | 3 | A1p |
| 1 | 2 | 3 | A1p | A1 | - | - |
| 2 | 2 | 5 | A1p | A1 | - | - |
| 3 | 2 | 5 | B4p | A1 | 5 | B4p |
| 6 | 3 | 4 | A2p | A2 | - | - |
| 8 | 3 | 4 | B5p | B5 | 4 | B4p |

FIG. 12

MANAGEMENT IN DATA STRUCTURES

This application claims priority under 35 U.S.C. §§119 and/or 365 to 9704767-4 filed in Sweden on Dec. 19, 1997; the entire content of which is hereby incorporated by reference.

1. Technical Field of the Invention

The invention relates to a direct and space-efficient way of managing symbols, preferrably letters and digits, in data structures.

2. Description of Related Art

When managing or "handling" symbols in data structures, i.e for example storing, deleting or searching, there is a need for both a rapid management and also a management of the symbols which do not use too much of memory space. This need increases of course with the amount of data processed.

Today there exist databases with vast amounts of data, e.g registers of telephone numbers that have to be searched millions of times every day. There are electronic dictionaries and tables of information everywhere in the modern society that are accessed frequently. The searching and storing methods for finding data in these registers are varying and more or less efficient. A common problem is however that the managing of these registers is very space demanding and time consuming and in real time applications the need for a fast and correct result of the management action might be essential.

For example, a typical problem which can arise when dealing with long strings of symbols, e.g telephone numbers is to, as quickly as possible, be able to determine if a given telephone number belongs to a predefined set of numbers. A possible application is for instance numbers which are on a black list, which is not to be accessible for calls from the outside. This example is equivalent to that of finding a given word in an electronic dictionary. A prior art example of this implementation uses data structures which are implemented as linked lists of records. The records are arrays of pointers with an element for each value (e.g a digit). When inserting a black-listed telephone number there will be a linked list of records, terminating in a record where the element for the last number contains a null pointer. Searching through these lists and finding a sequence of numbers which does not belong to anyone of the inserted ones allows the call to proceed. This example will be more clarified with reference to a drawing further down.

This structure allows detection of non-valid numbers with a minimum of information; as soon as a non-present element is encountered or the search tries to continue beyond a null pointer, it can be terminated with a negative result.

The problem with this so called single record type structure is that it is very space-intensive for storing long sequences. In the general case only the initial records in a chain will contain more than one present element. Therefore there will be huge amounts of unused space for the trailing symbols.

Another piece of prior art is published by Sussenguth: "Use of Tree Structures for Processing Files", Comm of the ACM, Vol 6, no 5, May 1963. Here Sussenguth describes use of tree structures for processing files. The application which is primarily addressed by Sussenguth is that of searching and updating large files with key values of varying length and initial coincidences. A specific application of this is the storage of dictionary data, eg for spelling checkers and translators. This prior art will also be more clarified further down and with reference to a figure.

In the international IBM-application PCT/EP94/02135, a design is suggested where the topic of finding a best match for keys of different length, for instance IP-addresses in a routing system is addressed. However the solution for optimization principles and search methods are different from what is described in the present application.

SUMMARY

In the literature on software engineering the trie (for "reTRIEve") store/search method is described as a common way of managing "dictionary" data, which are to be searched in order to find out whether a given word exists or not. The space requirements of the trie are also highlighted and various methods for limiting these requirements are proposed. However, there seems to be a lack of methods that in a simple manner conserve space and at the same time retain the speed of the search.

The core of this invention is the way methods from prior art are combined together with new matter to form a solution in which a data structure with a double set of records is used. That is for saving memory space and still have a very high performance for operations in applications where you have to store and search through long sets of records containing symbols, such as digits or letters.

The solution comprises a data structure and a method for, in a datastructure, storing, deleting and finding words or numbers where the double set of records means that a first set is a linked list of records as shown in prior art, but there is also a second list of strings containing the complete numbers. Examples will be given where the advantages of the solution will be apparent and where telephone numbers are used. The invention however, shall not be viewed upon as limited to only that application. Other sequences of symbols than numbers (e.g letters) may be used. The idea may also be used whenever a fast and effective managing of symbols is needed (e.g for searching through electronic dictionaries) and when maximum time/space performance is crucial. The need for a management of such datastructure is obvious when storing/searching subsets of several thousand numbers is done in various telecommunication services and a fast and space-efficient way of doing so is important for the in-service performance of the system.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

BRIEF DESCRIPTION OF THE DRAWINGS

Embodiments of the invention will be described in connection with the drawings on which:

FIG. 12 shows a state matrix table for storing a number in a data structure according to the invention.

DETAILED DESCRIPTION OF EMBODIMENTS

Figure 1:
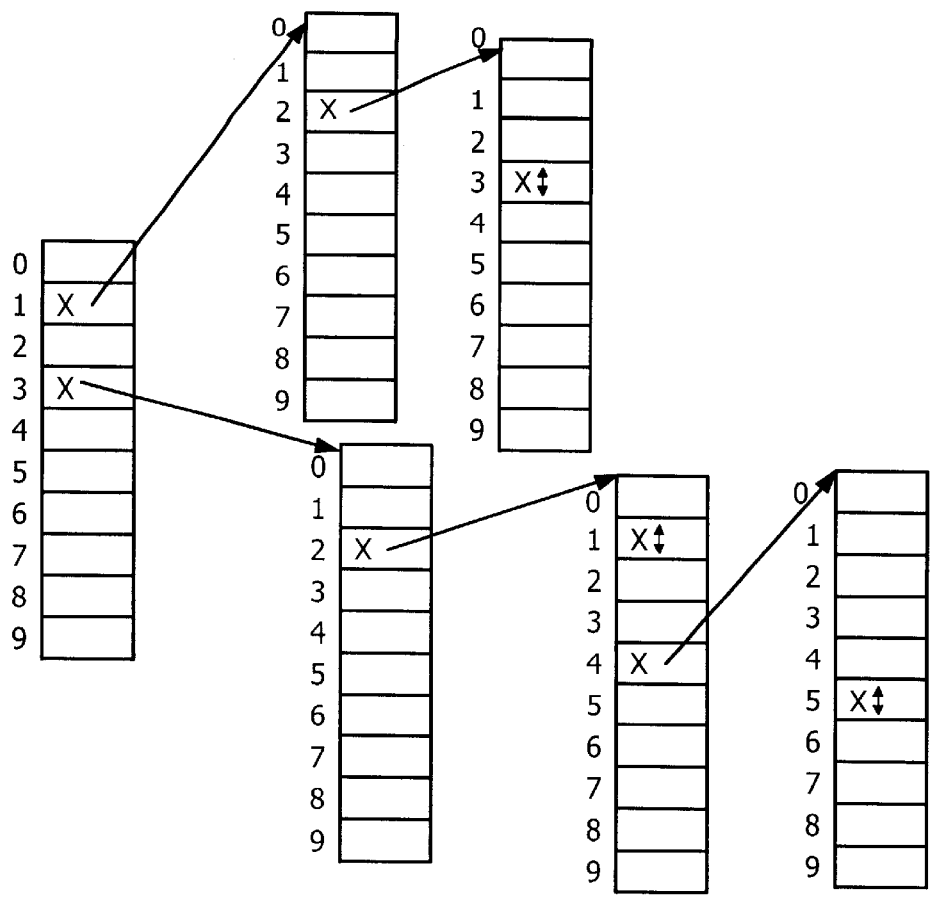
FIG. 1 shows a record layout for storing digits in a data structure according to prior art.

FIG. 1 shows an example from related prior art where a method is described demonstrating how to insert a blacklisted telephonenumber in linked lists of records in a single record type structure so as to rapidly find if a dialling subscriber is on the blacklist or not. A number is here supposed to be entered digit-by-digit. As soon as a number which does not belong to any of the predefined ones occurs, the search is to be terminated and the call to be allowed to proceed. This problem area is as said, often referred to as "trie search" (originally from reTRIEve) and the related data structures are implemented as linked lists of records. The records are arrays of pointers with one element for each value (alphabetic symbol in the general case, the digits 0–9 in this case). For any valid sequence there will be a linked list of records, terminating in a record where the element for the last valid symbol contains a null pointer. Hence FIG. 1 shows an example of how the sequences 123, 321 and 3245 would be represented. A position which is present in a record is represented by an "x"-mark and the null pointer is represented with an "✝" symbol.

Figure 2:
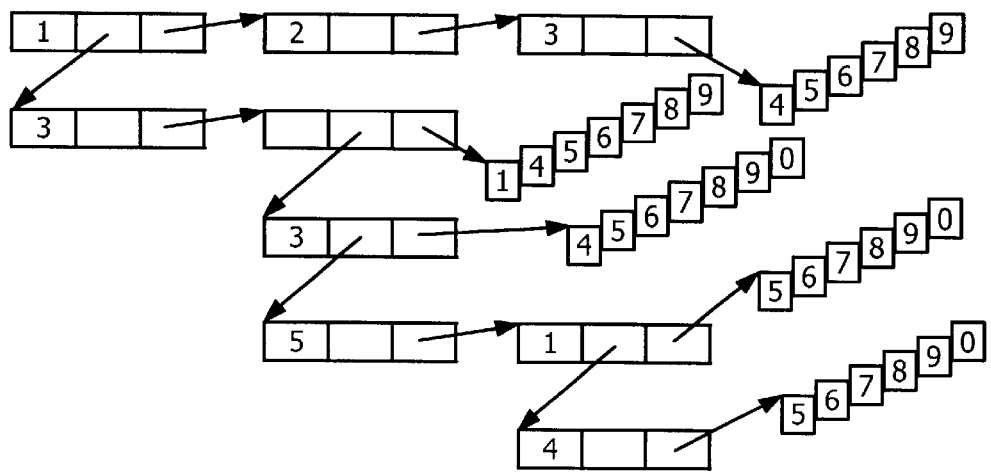
FIG. 2 shows another record layout for storing digits in a data structure according to prior art.

FIG. 2 shows another piece of prior art, namely Sussenguth's method, as described above. In the figure we see how five telephone numbers of each nine digits would be stored according to Sussenguth. The numbers are 123456789, 321456789, 334567890, 351567890 and 354567890. Each record in the structure of Sussenguth's proposal consists of a key value (e.g digit) and two pointer values. The first pointer points at another record on the same level, that is the record containing a key value for the same digit position. The second pointer points at the "filial set" of all numbers with the same initial sequence, at least up to the current depth (number of digits). Hence, the small squares represent records which only point out a filial set. For these trailing records there are no pointers to records representing the same digit position (the middle element in the record).

Sussenguth's solution resembles that of the single-record type trie described above, but the difference between the two methods is that in Sussenguth's proposal the digit positions at some certain levels are linked with pointers instead of being represented as elements of an array.

Figure 3:
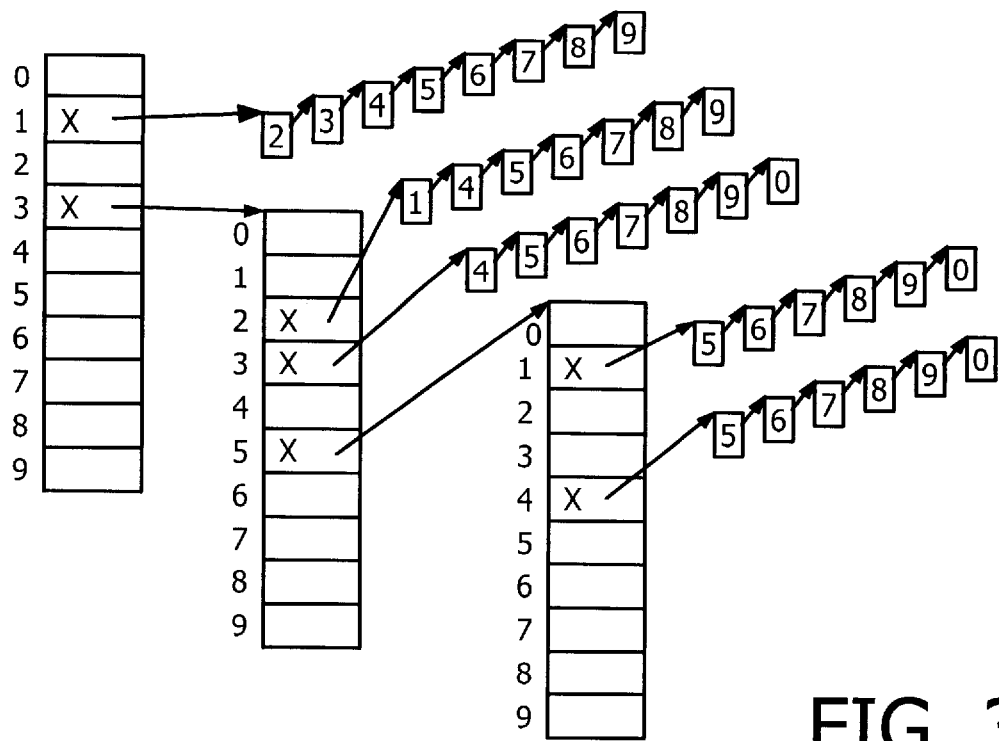
FIG. 3 shows a simplified record layout for storing digits in a data structure according to prior art.

In FIG. 3 we see how many strings we would need for the same example as above, here using storage in the single record type structure as is proposed in prior art. The small squares represent pointer records where only one element is used. This structure requires 814 bytes of data, compared with 126 bytes of data according to the invention. The calculations will be described further down.

The invention however, proposes a solution where the data structure in FIG. 1 is replaced by a double set of records. The first set is a linked list of records, as before, but there is a second list of strings, containing the complete numbers. The linked records are used only for as long as there are two or more elements marked as present. The terminating record element will point at the corresponding string.

FIGS. 4–8 will show how the inserting principle will work for the same sequences as above, i.e 123456789, 321456789, 334567890, 351567890 and 354567890 digit-by-digit. In this case the symbol "✝" will indicate that the pointer is to a string and not to another record. The FIGS. 4–8 show the record layouts on subsequent insertions of these numbers.

The array records of pointers are designated as 'type A', while the records of strings containing the numbers are designated as 'type B'. The very first record of type A exists initially, even if there are no numbers defined in the list. All items in this record are initiated to null pointers. The insertion procedure for new numbers will now be described stepwise. FIGS. 4–8 will also illustrate the result of the stepwise procedure.

It is to be noted that even though the examples below deal with managing of telephone numbers, the data might just as well constitute of other sequences of symbols:

Insertion of new numbers:

1. Select a current record, which is either the first record, or a record which is pointed at by the current pointer, initially pointing at the first A-record. Increment the depth counter, initially set to zero, by one.
2. Select the next digit of the number to be inserted. Initially this is=the first digit. This will be called 'current digit' in the following.
3. Using the value of the current digit as an index into the current record, find the current pointer at the corresponding position in the record. If this pointer points at another record of type A, go back to step 1, else proceed.
4. If the current pointer is null, create a record of type B and store the full number in it. Update the current pointer to point at the new B-record. This ends the insertion procedure. Else proceed.
5. Check if the current B-record contains the same number value as the number to be inserted. In such case the insertion procedure will terminate with an error 'number exists'. Else proceed.
6. Create and link in a new A-record which also implies redefining previous pointers. Increment the depth counter by one. Make the next digit in the number to be inserted the current digit.
7. In the current B-record, select the digit corresponding to the depth counter. Compare this digit to the current digit in the number to be inserted. If these digits are equal, go to step 6, else proceed.
8. Create a new B-record, insert the full new number there and insert a pointer to the B-record at an index position in the previous A-record which corresponds to the current digit. This ends the insertion procedure.

Looking at the FIGS. 4–8, we see the result of the insertion of the numbers 123456789, 321456789, 33456789, 35167890 and 354567890 according to the stepwise procedure above.

Figure 4:
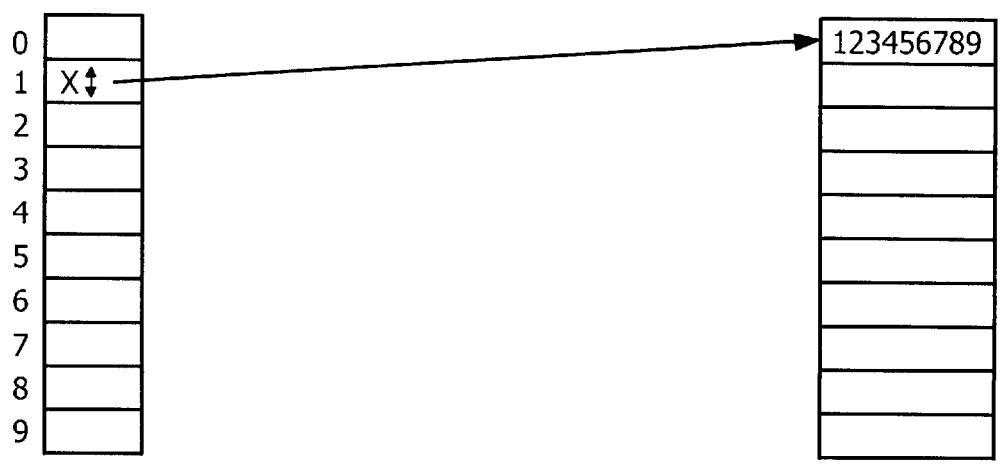
FIGS. 4–8 show record layouts on subsequent insertions of numbers in a data structure according to the invention.

FIG. 4 shows the insertion of the first number. The initial A-record and one B-record entry has been defined.

Figure 5:
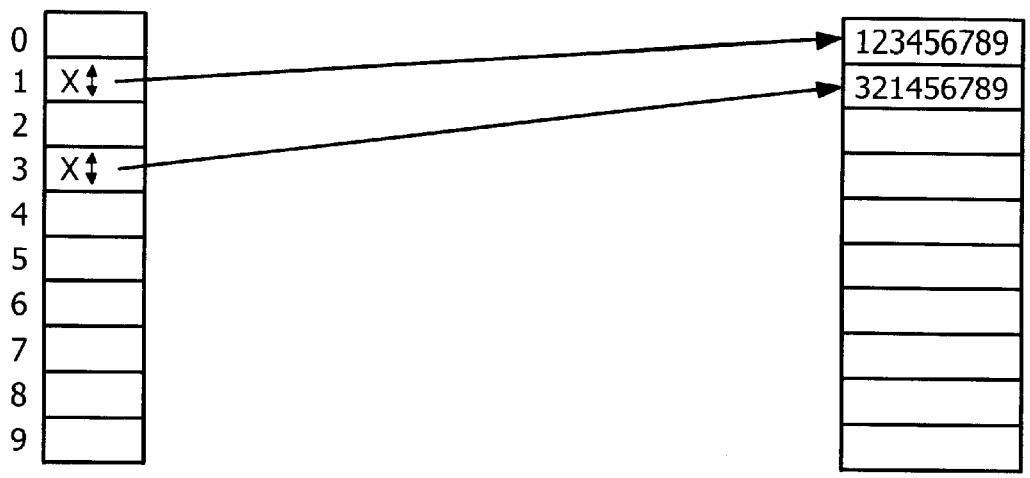

FIG. 5 shows the insertion of the second number. A new B-record entry has been defined.

Figure 6:
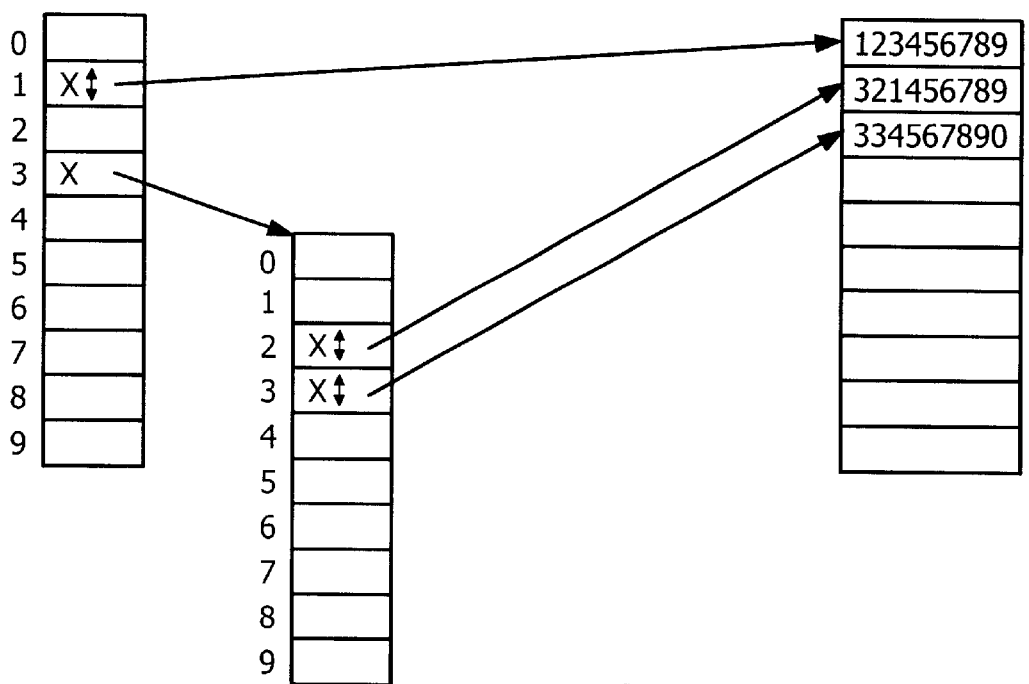

FIG. 6 shows the insertion of the third number. A new A-record has been created and a new B-record entry defined and the previous pointer to the second number to insert has been redefined.

Figure 7:
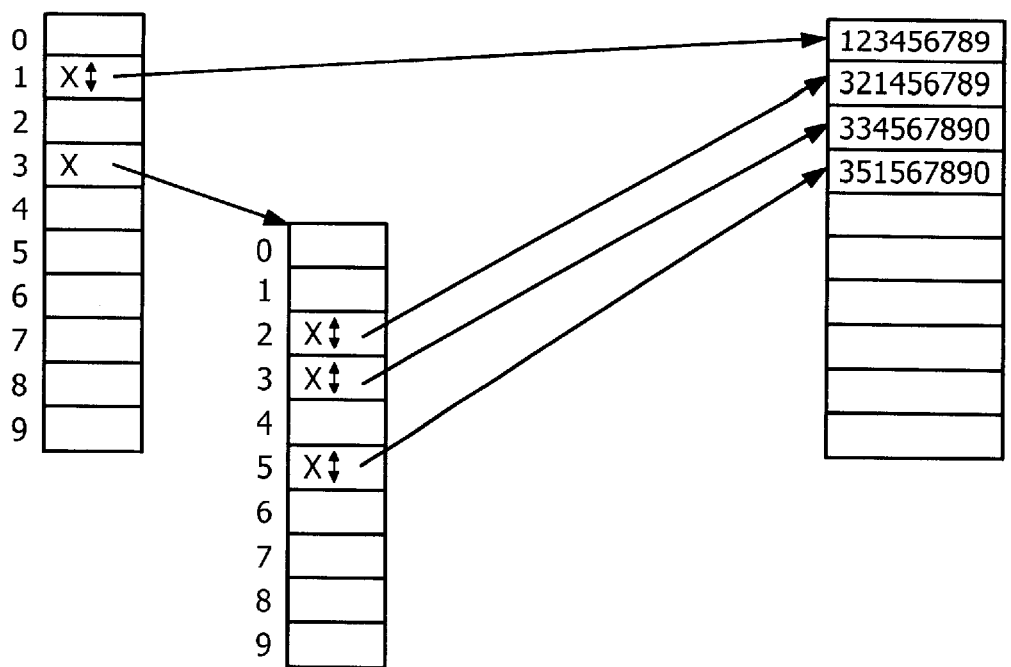

FIG. 7 shows the insertion of the fourth number. A new B-record entry has been defined.

Figure 8:
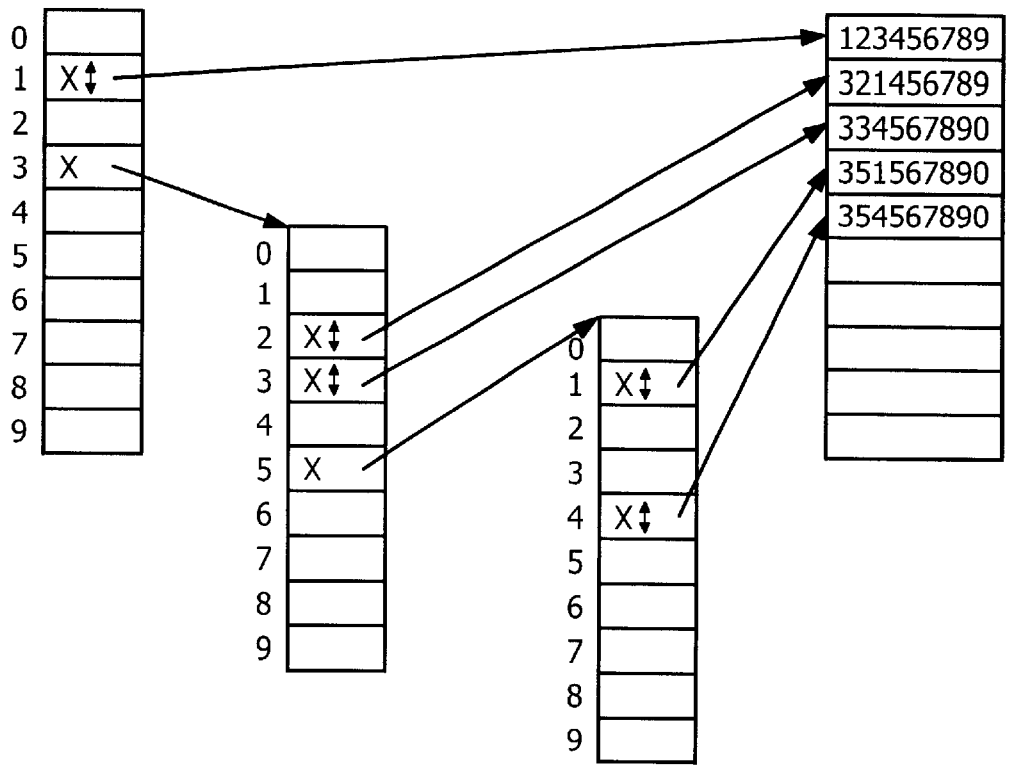

FIG. 8 shows the insertion of the fifth and last number in the example. Yet another new A-record is needed here. Here we also see how the previous pointer (to the fourth number) has been redefined.

Figure 9:
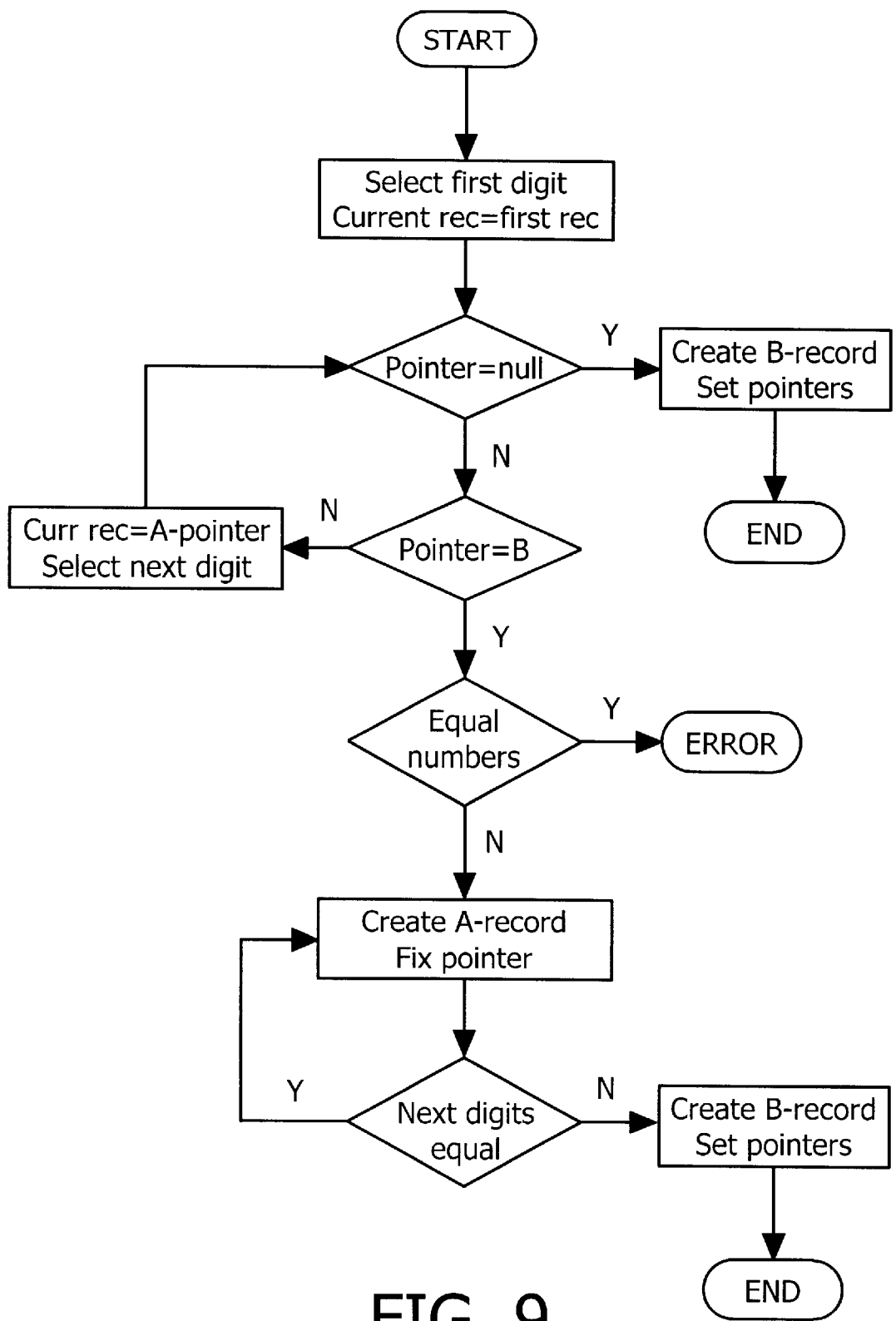
FIG. 9 shows a flow diagram for the insertion procedure according to the invention.

The modus operandi of the insertion procedure according to the invention can easily be shown in a flow diagram depicted in FIG. 9.

Figure 10:
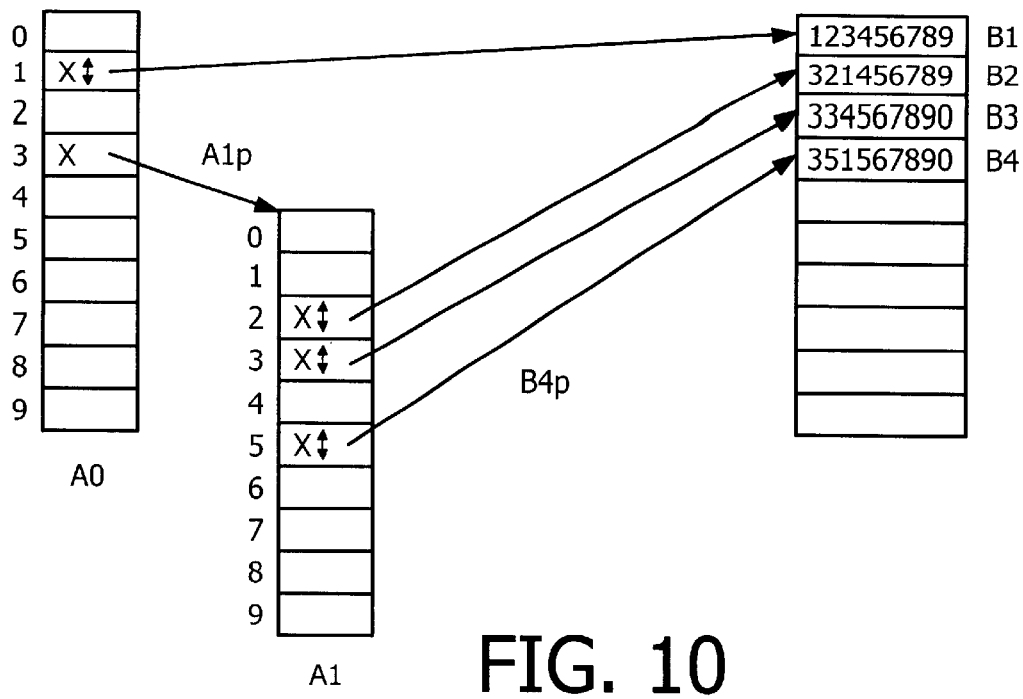
FIGS. 10–11 show a record layout for storing a number in a data structure according to the invention.
Figure 11:
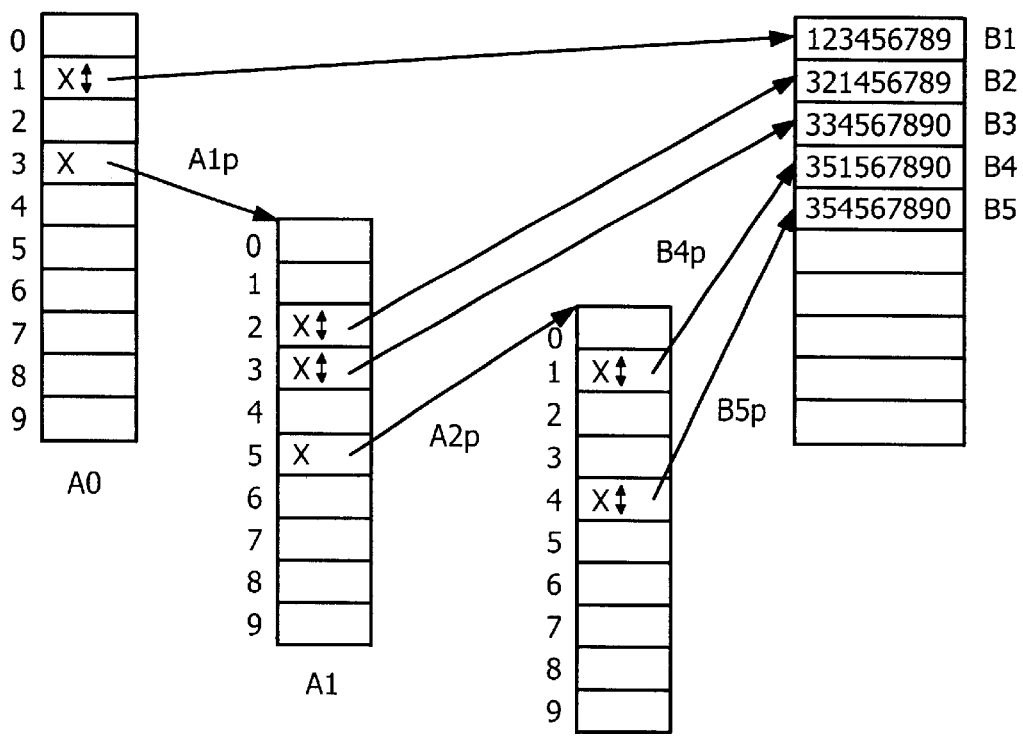
Figure 13:
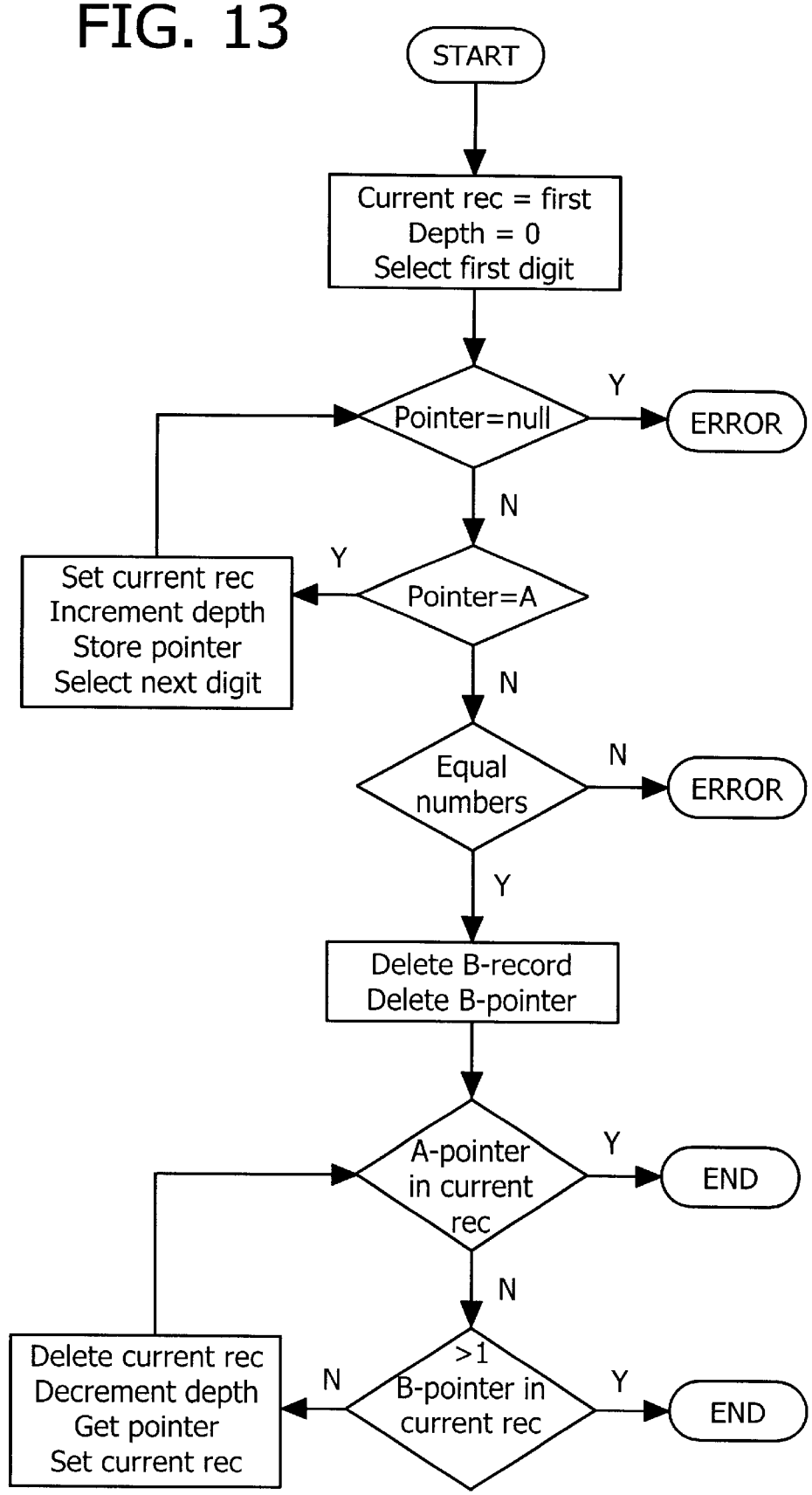
FIG. 13 shows a flow diagram for the deletion procedure according to the invention.
Figure 14:
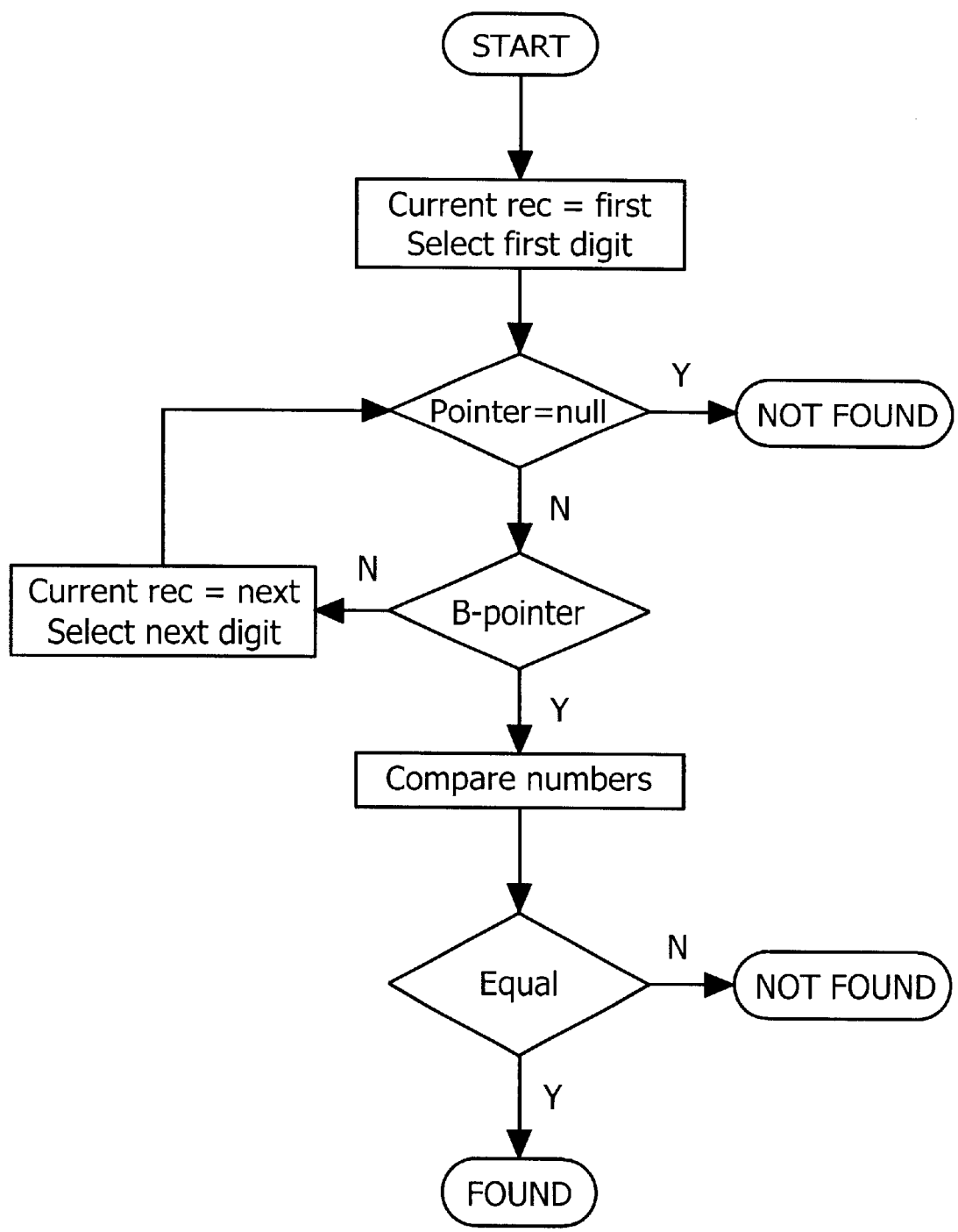
FIG. 14 shows a flow diagram for the finding/searching procedure according to the invention and FIG. 15 shows a diagram depicting storage requirements for single vs dual record type designs.

From the table in FIG. 12 with the appended FIGS. 10–11 there is yet another clarification of the method. Here we show a description in state-matrix form of the insertion of the fifth and last number (354567890) in the example which was given above. The FIGS. 10 (before) and 11 (after) are shown here with reference numbers.

This insertion procedure is now space-efficient while it retains the speed of searching. An extension of the idea may be realised within the true scope of the invention to form a single general inventive concept. Using the insertion method described above, a method for deletion of numbers and a method for finding of numbers in the records would be a natural extension of the idea. A stepwise explanation of the deleting and the finding/searching procedure together with FIG. 11 and 12 which depicts the relevant flow diagrams, will elucidate the methods.

Deletion of an existing number:
1. Select a current record, which is either the first record, or a record which is pointed out by the current pointer. Increment the depth counter, initially set to zero, by one.
2. Select the next digit of the number to be deleted. Initially this is=the first digit. This will be called 'current digit' in the following.
3. Using the value of the current digit as an index into the current record, find a new current pointer at the corresponding position in the record. Store the value of the current pointer in a temporary array at an index value corresponding to the depth counter. If this pointer points at another record of type A, go back to step 1, else proceed.
4. If the current pointer contains a null value, the deletion procedure will terminate with an error: 'not found'.
5. Else if the current pointer points to a record of type B, check if the number contained in that B-record is the same as the one to be deleted. In such case, delete that record, else terminate with an error: 'not found'.
6. Set the current B-pointer in the A-record to null.
7. If there is more than one B pointer or any A pointer in the current A-record, the deletion procedure ends.
8. Else, if there is only one B-pointer left in the current A-record, that A-record is deleted. The B-pointer is moved to the previous A-record, making it the current record and replacing the A-pointer to the deleted record with the B-pointer. Go back to step 7.

Finding a number:
1. Select a current record, which is either the first record, or a record which is pointed out by the current pointer. Increment the depth counter, initially set to zero, by one.
2. Select the next digit of the number to be found. Initially this is=the first digit. This will be called 'current digit' in the following.
3. Using the value of the current digit as an index into the current record, find a new current pointer at the corresponding position in the record. If this pointer points at another record of type A, go back to step 1, else proceed.
4. If the current pointer contains a null value, the search procedure will terminate with 'not found'.
5. Else if the current pointer is to a record of type B, retrieve that record as candidate number.
6. Scan the candidate number, digit by digit, comparing with the corresponding digits in the number to be found. If there is a mismatch in digits at corresponding positions, or if the numbers are of unequal lengths, terminate with 'not found'. If all digits in both numbers have been compared and found equal, end the search with 'found'.

The space requirements for the inserting example above with five numbers of nine digits each compare to prior art as follows: The single record type case in FIG. 1 would require 37 records, or 814 bytes as seen in FIG. 3 where the small squares represent pointer records where only one element is used, assuming that each pointer is 2 bytes, making a total of 20 bytes for pointers, and that there are 2 bytes extra for flags (present/not present) per record, i.e 22 bytes/record.

The Sussenguth method as depicted in FIG. 2 would imply, for the same example, a need for 41×5=205 bytes of storage space, assuming that each record is 2×2 bytes for pointers and 1 byte for the key (digit).

The dual record type case according to the invention would require three pointer array records and five string records (FIG. 8). With the assumption that each string record is dimensioned to contain 24 digits (=12 bytes) this would render a total of 3×22+5×12 =126 bytes, ie about 15% of the space required for the single record type case.

The Sussenguth method is worse than for the dual record type method, but better than the single array record case described above. Searching with the Sussenguth method would be slower than for the single array or double array method. The reason why searching is slowed down is that on the average five pointers have to be followed on each of the initial levels to find a match/non-match. Computer logics are also less efficient in addressing by pointers than by array indices.

In order to compare the two methods for a larger set of numbers of varying lengths, a mathematical simulation has been made. A series of more than 1000 random numbers of random lengths, ranging from 2 to 24 digits, was generated. The distribution was such that the majority of the numbers had around 12 digits. The outcome is that for 1000 numbers the single record type model would require some 200 k bytes, while the dual record type model would need only some 27 k bytes, or 13%. This shows that significant amounts of memory can be saved, which is important when a large number of program modules compete for the available data memory space in e.g a telephone switching station.

Figure 15:
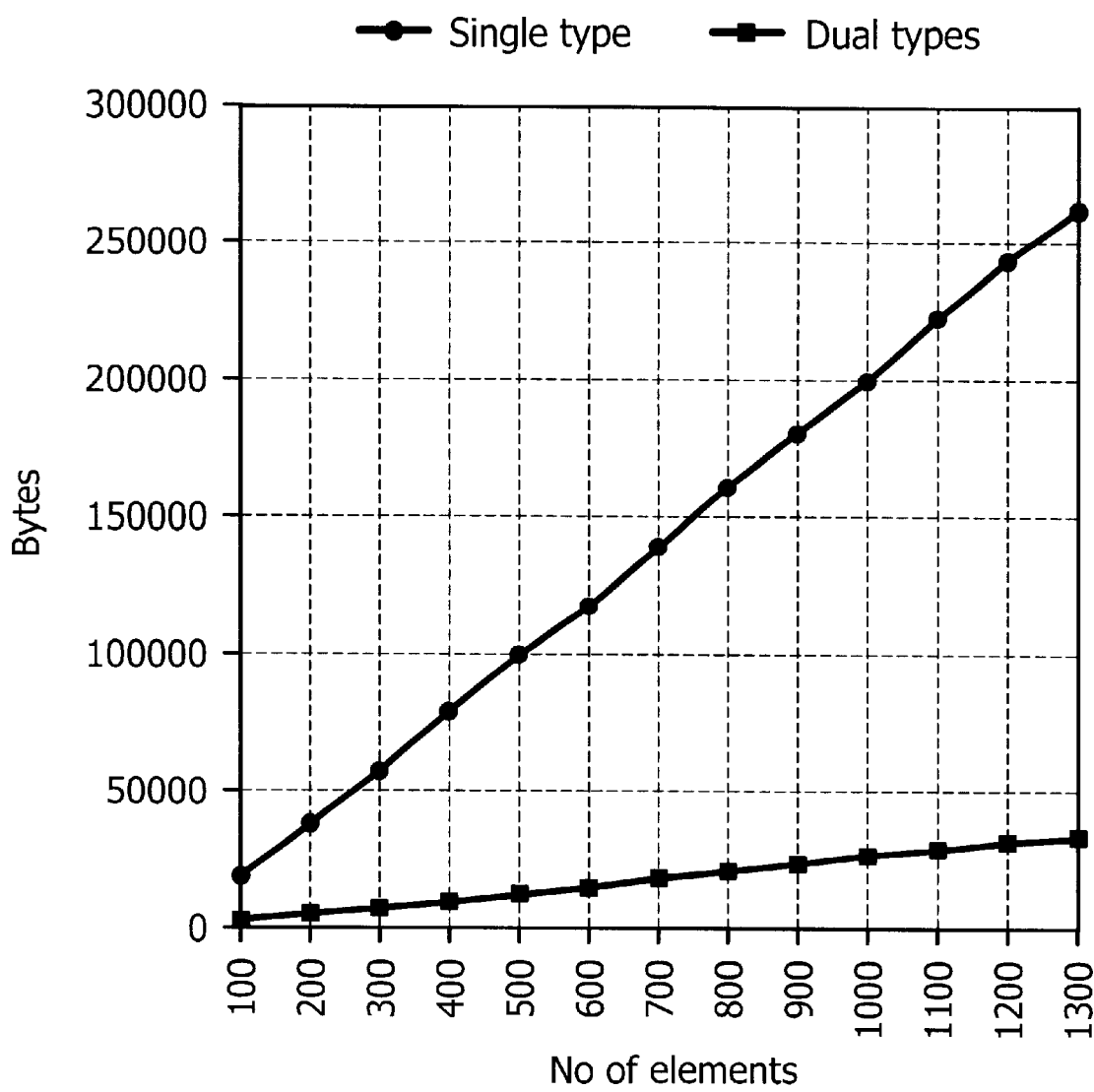

FIG. 15 shows how the two types of design compare for a varying number of elements. This diagram is the outcome of the mathematical simulation mentioned above, for a specific distribution of numbers. The analysis is made on a set of random numbers which are sorted in ascending order as strings (that is '23' has a higher sort order than '2299999').

The idea of the application may be used in other applications of searching, where the input key value is given one element at a time. This may apply e.g. to routing analysis and home register location searches.

What is claimed is:

1. Method for managing sequences of symbols in a data structure comprising linked lists of records, characterized in that the sequences of symbols are inserted symbol-by-symbol into a double set of records:
   a first set of linked lists of records (A-records) which are array records of pointers with an element for each symbol
   a second set of strings (B-records) containing the complete sequences of symbols entered, wherein initially a first A-record is defined and that all elements in said A-records are initiated to null-pointers followed by the insertion of a sequence of symbols comprising the steps of:
   (i) selecting a current record, which is either the first record, or a record which is pointed at by the current pointer, initially pointing at the first A-record, incrementing a depth counter, initially set to zero, by one, (ii) selecting the next symbol of the sequence of symbols to be inserted which initially will be the "first" symbol and later the "current" symbol, (iii) using the value of the current symbol as an index into the current record, finding the current pointer at the corresponding position in the record and if this pointer points at another A-record, going back to step (i), (iv) if the current pointer is null, creating a B-record and storing the full sequence of symbols in it and updating the current pointer to point at the new B-record which ends the insertion procedure, else proceeding, (v) checking if the current B-record contains the same sequence of symbols as the sequence of symbols to be inserted and if so, terminating the insertion procedure, else proceeding, (vi) creating and linking in a new A-record and incrementing the depth counter by one and making the next symbol in the sequence of symbols to be inserted the "current" symbol, (vii) in the current B-record, selecting the symbol corresponding to the depth counter and comparing this symbol to the current symbol in the sequence of symbols to be inserted and if these symbols are equal, go to step (vi), else proceeding, (viii) creating a new B-record, inserting the full new sequence of symbols there and inserting a pointer to the B-record at an index position in the previous A-record which corresponds to the current symbol.

2. Method for managing sequences of symbols in a data structure according to claim 1, characterized in that the symbols imply digits and that the sequences of symbols imply telephone numbers.

3. Method for managing sequences of symbols in a data structure comprising linked lists of records, characterized in that the sequences of symbols are inserted symbol-by-symbol into a double set of records:

a first set of linked lists of records (A-records) which are array records of pointers with an element for each symbol a second set of strings (B-records) containing the complete sequences of symbols entered, wherein deleting a sequence of symbols comprises the steps of:

(i) selecting a current record, which is either the first record, or a record which is pointed out by the current pointer and incrementing the depth counter, initially set to zero, by one;

(ii) selecting the next symbol of the sequence of symbols to be deleted which initially will be the "first" symbol and later the "current" symbol;

(iii) using the value of the current symbol as an index into the current record, finding a new current pointer at the corresponding position in the record, storing the value of the current pointer in a temporary array at an index value corresponding to the depth counter and if this pointer points at another A-record, going back to step (i), else proceeding;

(iv) checking if the current pointer contains a null value, and if so terminating the deletion procedure;

(v) else if the current pointer points to a B-record, checking if the sequence of symbols contained in that B-record is the same as the one to be deleted and if so, deleting that record, else terminating the deletion procedure (vi) setting the current B-pointer in the A-record to null;

(vii) if there is more than one B-pointer or any A-pointer in the current A-record, ending the deletion procedure;

(viii) else, if there is only one B-pointer left in the current A-record, deleting that A-record, moving the B-pointer to the previous A-record, making it the current record and replacing the A-pointer to the deleted record with the B-pointer and going back to step (vii).

4. Method for managing sequences of symbols in a data structure according to claim 3, characterized in that the symbols imply digits and that the sequences of symbols imply telephone numbers.

5. Method for managing sequences of symbols in a data structure comprising linked lists of records, characterized in that the sequences of symbols are inserted symbol-by-symbol into a double set of records:

a first set of linked lists of records (A-records) which are array records of pointers with an element for each symbol a second set of strings (B-records) containing the complete sequences of symbols entered, wherein finding a sequence of symbols comprises the steps of:

(i) selecting a current record, which is either the first record, or a record which is pointed out by the current pointer and incrementing the depth counter, initially set to zero, by one;

(ii) selecting the next symbol of the sequence of symbols to be found which initially is the first symbol and later "current" symbol;

(iii) using the value of the current symbol as an index into the current record, finding a new current pointer at the corresponding position in the record and if this pointer points at another A-record going back to step (i), else proceeding;

(iv) checking if the current pointer contains a null value and if so, terminating the search procedure with "not found";

(v) else if the current pointer is to a record of type B, retrieving that record as candidate sequence of symbols;

(vi) scanning the candidate number, symbol by symbol, comparing with the corresponding symbols in the sequence of symbols to be found and if there is a mismatch in symbols at corresponding positions, or if the sequences of the symbols are of unequal lengths, terminating the search with "not found" and if all symbols in both sequences of symbols have been compared and found equal, ending the search with "found".

6. Method for managing sequences of symbols in a data structure according to claim 4, characterized in that the symbols imply digits and that the sequences of symbols imply telephone numbers.

* * * * *